United States Patent [19]

Goetzman

[11] Patent Number: 4,630,553

[45] Date of Patent: Dec. 23, 1986

[54] DUAL STAGE COMBUSTION FURNACE

[76] Inventor: Robert G. Goetzman, 519 Cayuga Ave., Niagara Falls, N.Y. 14304

[21] Appl. No.: 819,982

[22] Filed: Jan. 15, 1986

Related U.S. Application Data

[60] Continuation of Ser. No. 634,096, Aug. 30, 1984, abandoned, which is a division of Ser. No. 501,738, Jun. 6, 1983, Pat. No. 4,484,530.

[51] Int. Cl.[4] .............................................. F23B 5/00
[52] U.S. Cl. .................................... 110/214; 110/293; 110/296; 110/298; 110/303; 126/68; 126/73; 126/77; 126/112; 431/328
[58] Field of Search ...................... 110/116, 118–119, 110/203, 208, 210–211, 214, 248, 251, 293, 295–296, 298, 300, 322–323, 190; 126/71, 73, 77, 99 R, 99 D, 107, 112, 118, 163 R, 163 A, 68; 431/7, 328; 422/177

[56] References Cited

U.S. PATENT DOCUMENTS

| | | | |
|---|---|---|---|
| 1,731,311 | 10/1929 | Marichal | 126/77 |
| 2,151,642 | 3/1939 | Rose | 126/73 |
| 2,549,788 | 4/1951 | Fellows | 126/77 |
| 2,845,882 | 8/1958 | Bratton | 110/190 |
| 3,707,142 | 12/1972 | Kobayashi | 122/17 |
| 3,906,873 | 9/1975 | Green et al. | 110/119 |
| 4,341,199 | 7/1982 | Hand, Jr. et al. | 110/300 |
| 4,360,000 | 11/1982 | Down | 126/77 |
| 4,373,507 | 2/1983 | Schwartz et al. | 110/203 |
| 4,432,287 | 2/1984 | Brillantes | 110/300 |
| 4,484,530 | 11/1984 | Goetzman | 110/298 |

Primary Examiner—Albert J. Makay
Assistant Examiner—Steven E. Warner
Attorney, Agent, or Firm—Martin LuKacher

[57] ABSTRACT

A dual stage combustion furnace has primary and secondary combustion chambers. The primary combustion chamber contains a solid fuel, such as wood or coal. The secondary combustion chamber is formed adjacent to and in communication with the primary combustion chamber for containing and igniting volatile combustion gases produced in the primary chamber. A plurality of hollow members, which provide a grate, extend through the primary chamber, and into the secondary chamber. Volatile gases given off in the primary combustion chamber are then ignited and burned in the secondary combustion chamber upon combination with heated air passing through the hollow grate members.

9 Claims, 6 Drawing Figures

DUAL STAGE COMBUSTION FURNACE

This is a continuation of application Ser. No. 634,096, filed 8/30/84, now abandoned, which is a division of application Ser. No. 501,738, filed 6/6/83, now U.S. Pat. No. 4,484,530.

BACKGROUND OF THE INVENTION

1. Field of the Invention

The present invention relates to improvements in solid fuel burning stoves and furnaces and, more particularly, to stoves and furnaces wherein gaseous volatiles given off by primary combustion are themselves ignited and burned in a secondary combustion chamber.

2. Description of the Prior Art

Numerous attempts have been made in the past to provide a stove or furnace which efficiently burns solid fuels, such as coal or wood. When burning such solid fuels, coal in particular, some form of support, such as a grate, must be provided upon which the fuel rests. Further, an outside air intake must be situated below or above the grate. Air is drawn in through the intake and passes up the grate and existing spaces in the fuel, thereby providing oxygen necessary to support combustion. The resulting fire in the combustion chamber provides the heat to warm living or working quarters. However, in previously known solid fuel stoves and furnaces a great deal of the heat potential is lost up the chimney without ever being efficiently converted to heat. In many instances, the byproducts caused by initial combustion are given off as gases which rise up the chimney where they cool and form deposits, commonly known when burning wood, as creosote. The deposits on the chimney can be quite dangerous as they may themselves be ignited resulting in a chimney fire.

Examples of various types of prior furnaces such as described above, may be found in the following U.S. Pat. Nos. 163,009; 229,684; 707,364; 1,484,908; 1,485,545; and 2,070,536.

SUMMARY OF THE INVENTION

The present invention provides a solid fuel burning stove or furnace which provides heat from initial combustion and then, in secondary combustion, ignites and almost completely burns the gases given off by the initial combustion. Thus, more BTU's per pound of fuel are available. Further, the solid fuel stove or furnace constructed according to principles of the present invention is simple and self regulating, needing no damper control, nor sophisticated air intake control. The amount of combustion air is automatically regulated by the temperature of the combustion taking place. As the fire becomes hotter the amount of air taken in is decreased and the fire intensity is reduced. However, as the fire intensity decreases, the air intake increases which brings the fire intensity back to temperature.

Still further, the furnace described herein features a grate which is self cooling and therefore impervious to the normally deleterious effect of combustion occuring in direct contact thereon.

A further benefit may be found in that the fuel burned has been burned so completely that the gases given off are less noxious than would otherwise be the case. Therefore, with soft coal any deleterious effect on the ecology of coal burning is reduced. A still further benefit is derived from the fact that the furnace described and claimed herein is far more efficient than the solid fuel furnaces known heretofore in that the consumption of fuel will be substantially reduced.

DETAILED DESRIPTION OF THE INVENTION

Figure 1:
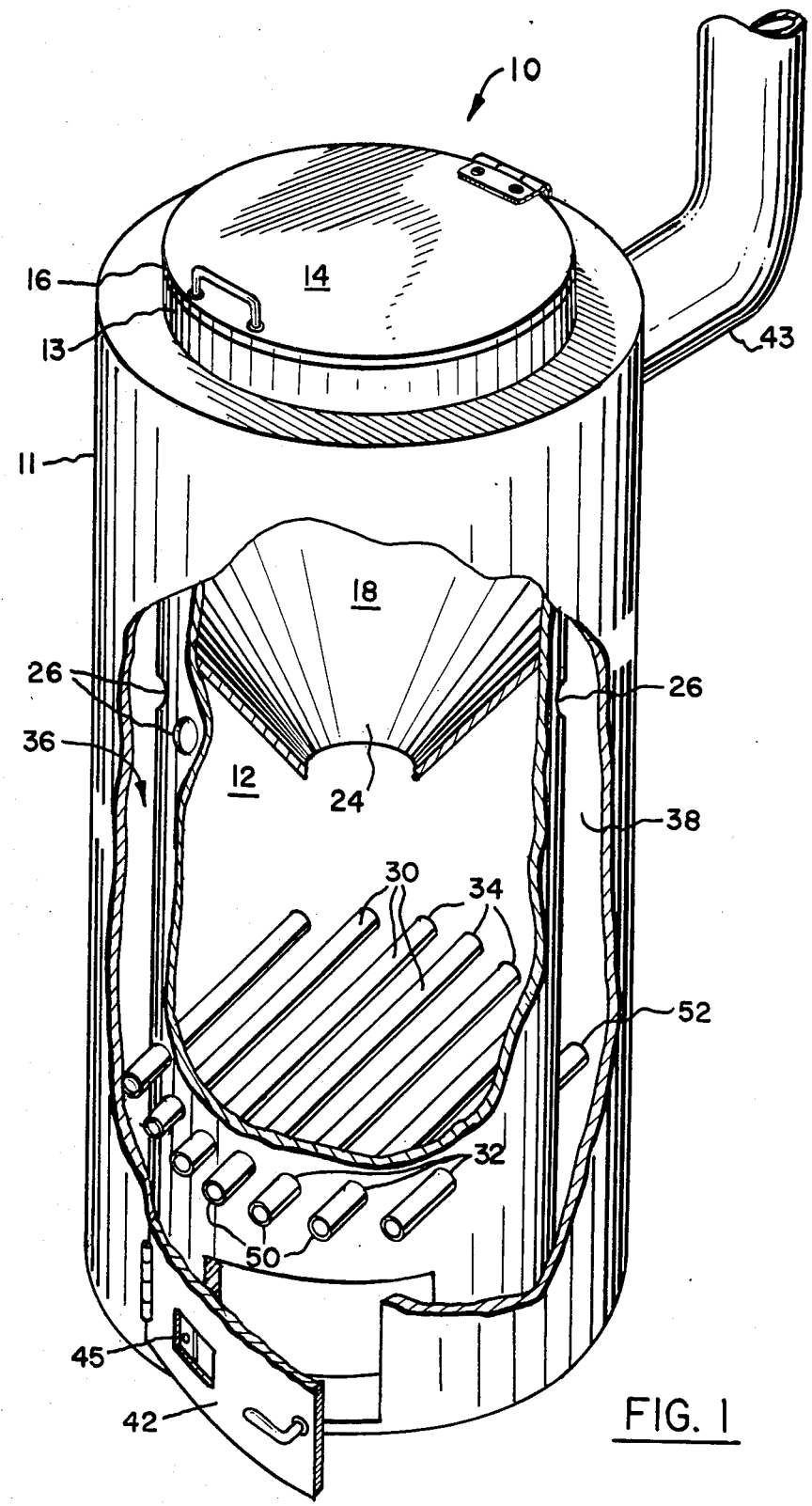
FIG. 1 is a partially cut away, perspective view of my solid fuel burning furnace.
Figure 2:
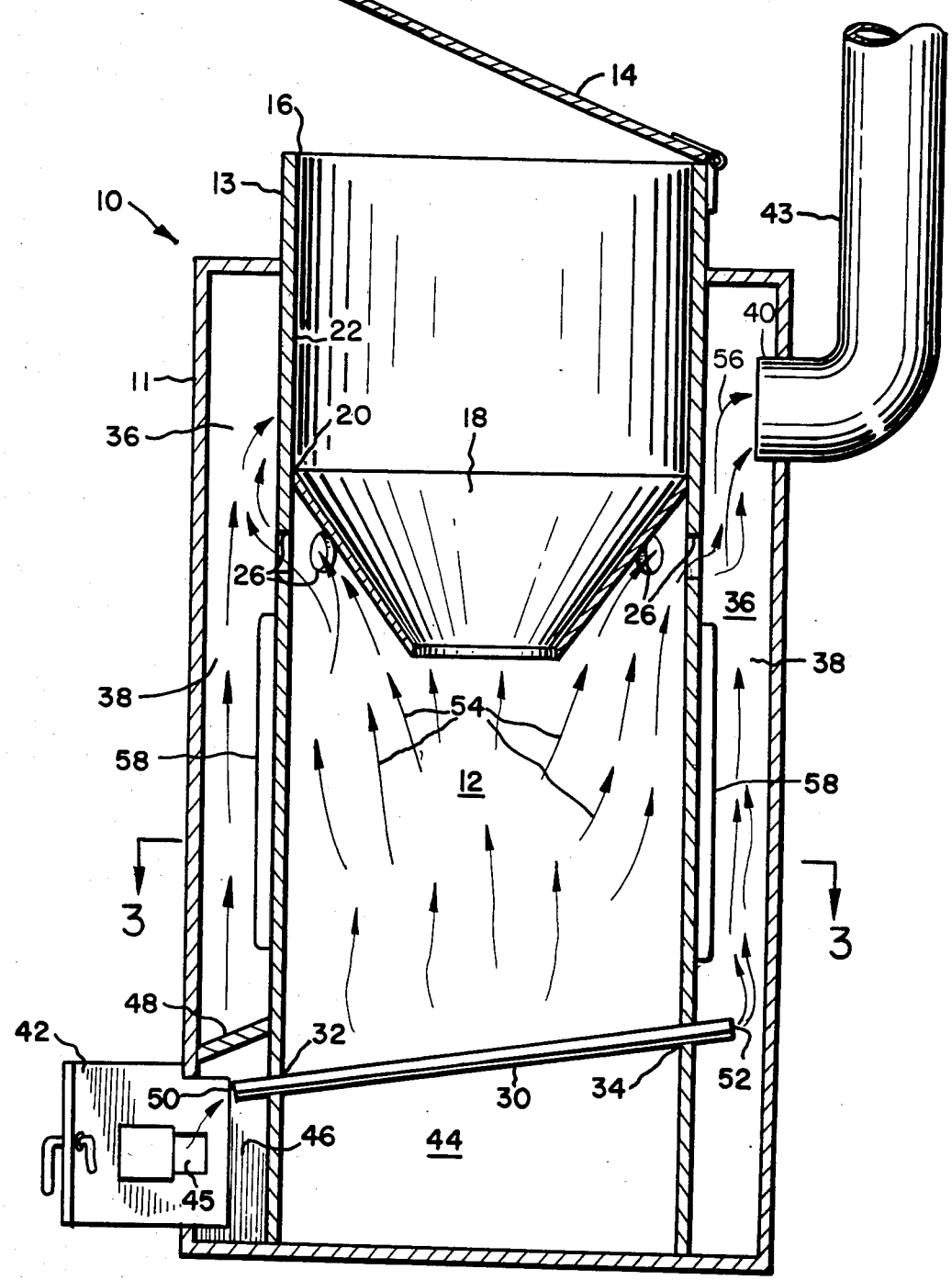
FIG. 2 is a side view, in section, of the furnace shown in FIG. 1.
Figure 3:
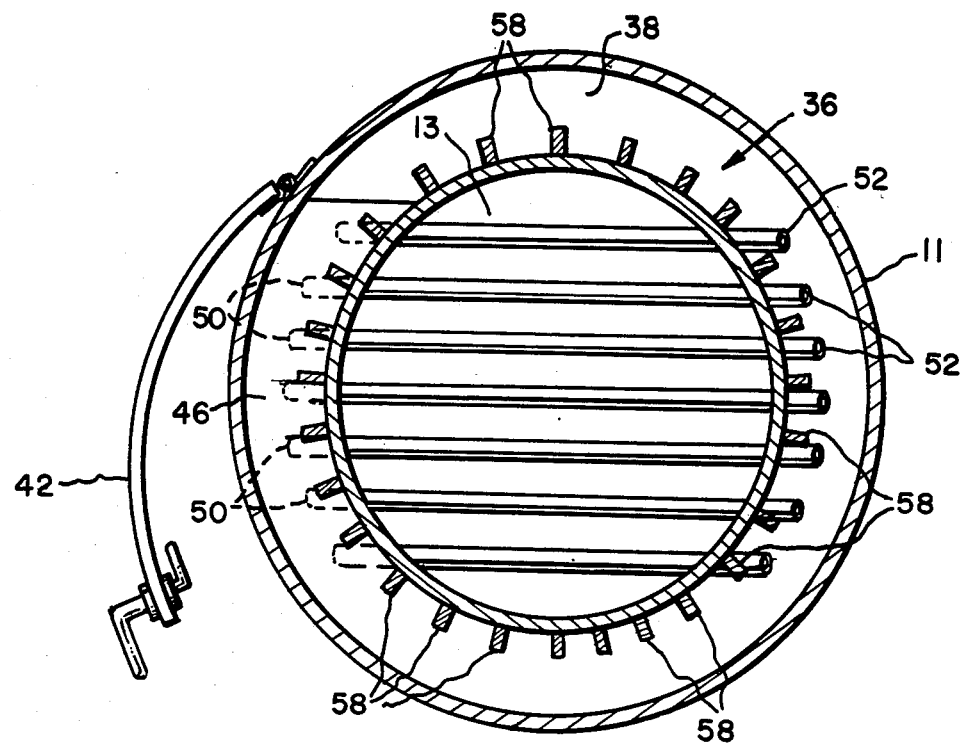
FIG. 3 is a sectional view taken along line 3—3 of FIG. 2.

Referring to FIGS. 1–3 of the drawings, one embodiment of my new self regulating solid fuel furnace may be clearly seen. The furnace 10 is of a generally cylindrical shape with inner and outer cylinders or drums 11 and 13. Other shapes (e.g. rectangular or square) may be used. A primary combustion chamber 12, has a fuel access door 14 located at its upper most portion 16. A funnel shaped member 18 is mounted at its larger diameter 20 to the interior surface 22 of primary combustion chamber with the smaller opening 24 thereof being located downward from the fuel access door with respect to larger opening 20. A plurality of apertures 26 are formed in the primary combustion chamber 12 just below where the larger diameter 20 of funnel 16 is mounted. A plurality of hollow members, or tubes, 30 extends through front apertures 32 and rear apertures 34 of the primary combustion chamber. The tubes 30 are located in apertures 32 and 34 and can be rotated if desired. The front apertures 32 are lower in the chamber 12 than the rear apertures 34, which results in the tubes 30 tilting upward toward the rear. The tubes 30 provide a grate, upon which the solid fuel is supported.

A secondary combustion chamber 36 is formed about and joined to the primary combustion chamber 12 and creates an annular air space 38 therebetween. The secondary combustion chamber 36 has an exhaust port 40. A flue pipe 43 is fitted to the exhaust port 40 for connection to appropriate venting means. Secondary combustion chamber 36 further has an ash clean out door 42 which permits access into the bottom portion 44 of primary combustion chamber 12. The front ends or lower portions of the tubes 30 extend through the secondary combustion chamber 36 so as to be in juxtaposition with ash door 42. The ash door 42 is fitted loosely to chamber 36 such that ambient air may be drawn in around the door 42 into hollow members 30. Alternatively, openings 45 in the door may be provided.

In operation, fuel is introduced to the primary combustion chamber 12 through fuel access door 14. The fuel passes through funnel 18 and rests on the tubes 30 providing the grate. The fuel initially charged is sufficient to form a pile above the hollow grate tubes 30 which reaches small diameter end 24 of funnel 18, thereby blocking it. A fire is then started in the fuel pile at the lower portion supported by the grate tubes 30. As previously stated, the solid fuel is piled to such an extent that it blocks the funnel. Therefore, no air is taken into the primary combustiton chamber 12 through, for instance, the fuel access door 14; nor are gases expelled therethrough. Instead, combustion air is taken in through ash door 42.

As the fire intensifies, gasses created by the burning fuel pile are vented through the apertures 26 in primary combustion chamber 12. As the fire burns, a portion of the air drawn in through the ash door 42 is directed into and through the grate tubes 30. The area 46 between the primary combustion chamber 12 and the secondary combustion chamber 36 has a seal 48 so that no primary combustion air is taken initially into the secondary chamber 36. The primary combustion air, however, taken into the hollow grate tubes 30 is heated by the combustion taking place above. The incline of the grate members explained earlier, and evident in FIG. 2, assists in moving the air being heated in the grate tubes 30 from their primary air intake ends at 50 to exhaust at their opposite ends 52 into the space 38 of the secondary combustion chamber 36. The air moving through the tubes 30 further acts to cool them, substantially increasing their lifespan as compared to solid grate bars.

In the process of burning, the fuel pile gives off volatile gases 54 which are exhausted through primary combustion chamber apertures 26 into the space 38 of secondary combustion chamber 36. The air being exhausted into the secondary chamber 36 by the hollow grate tubes 30 is super heated as it rises in the region around the primary combustion chamber. This super heated air is of such a temperature that when it encounters the volatile exhaust gases 54 it causes them to ignite. This ignition of the volatile gases produces additional heat from a source which is normally exhausted as a pollutant into the atmosphere. Additionally, a plurality of heat transfer fins 58 may be formed on the outside 60 of primary combustion chamber 12. These fins aid in the secondary combustion proces by ensuring that the air is sufficiently super heated to cause secondary combustion. Also, the secondary combustion chamber may have an insulative blanket not shown added to retain heat absorbed. After ignition of the volatile gases 54 has taken place, normal exhaust takes place with the fully burned gases 56 being passed out the flue pipe 43.

The apertures 26 are preferably located approximately one half way up the furnace. Consequently, the heat produced is distributed evenly over a very wide external area, resulting in a most efficient distribution of heat. If desired a heat exchanger, e.g. a jacket or helical tube, may be secured to the outside of the drum 11. Water may be circulated through the exhanger to provide hot water for heating, washing, and the like. Because the furnace is super heated and burns nearly all volatile substances, it produces very few products which cause heat exchangers to clog up with soot. The requirement for periodic cleaning is thereby reduced.

Figure 4:
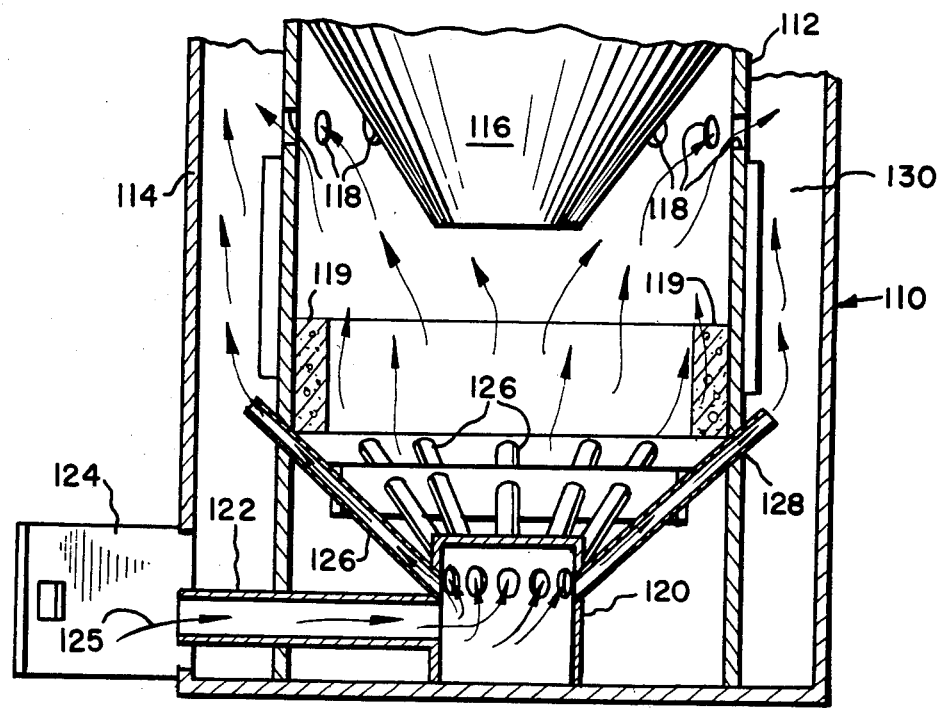
FIG. 4 partial side view in section of another embodiment of my furnace.

A further embodiment of my furnace is shown in FIG. 4 wherein a furnace 110 similar to the one previously described, includes a primary combustion chamber 112 and a secondary combustion chamber 114. The primary chamber 112 has a fuel funnel 116, exhaust apertures 118, and a refractory lining 119. Centered at the bottom of the primary chamber 112 is a plenum chamber 120 which is connected via intake port 122 and apertured ash door 124 to the source of ambient air 125. Plenum chamber 120 has a plurality of hollow grate members 126 which are fixed to and extend radially upwardly therefrom. The grate members 126 pass through apertures 128 formed in the primary chamber 112 and terminate in space 130 of secondary chamber 114. The same combustion process as described in connection with the furnace illustrated in FIGS. 1–3 occurs in this embodiment; the only difference being that the combustion air is taken in through intake 122 and distributed by plenum 120 through the radially upwardly disposed grate members 126.

Figure 5:
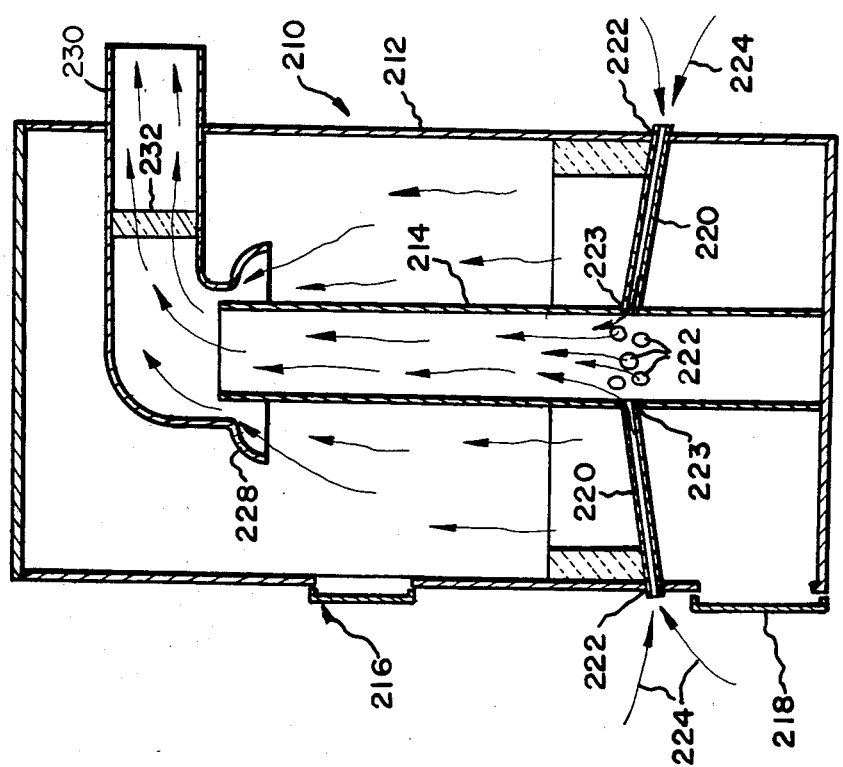

Another embodiment of my invention is shown schematically in FIG. 5. A dual stage furnace 210 has a primary chamber 212 and a secondary chamber 214. In this embodiment, the secondary chamber 214 is mounted inside the primary chamber 212 rather than vice versa as in the previously described embodiments. The primary chamber 212 has a fuel access door 216 through which fuel is introduced, and an ash door 218 through which ashes may be extracted. The secondary chamber 214 has a plurality of intake grate tube members 220 which extend radially therefrom, similar to the spokes on a wagon wheel. The intake members 220 are positioned in front apertures 222 and rear appertures 223, respectively, in primary chamber 212 and communicate with the ambient to receive outside air 224 which is super heated and circulated to the secondary chamber 214. The grate tube members 220 rise slightly from the front apertures 222 to the rear apertures 223 in the wall of the secondary chamber 214.

The secondary chamber 214 terminates at an exhaust hood 228 formed in primary chamber 212. The hood 228 is connected to a flue pipe 230. A silicon carbide honeycomb 232 may be provided in the flue pipe 230 to confine heat to the furnace, as more fully described below.

In operation, fuel is introduced through fuel door 216 and supported on the grate tubes 220. The fire is started, and combustion air drawn in through ash door 218. Volatile exhaust from the fuel is collected at the exhaust hood 228. Air taken in through the grate tubes 220 is super heated by the primary combustion and rises up secondary chamber 214 where it continues to become hotter. The super heated air contacts the volatile gases at the exhaust hood 228 and proceeds to cause the gases to ignite, thereby creating additional heat within the furnace.

Figure 6:
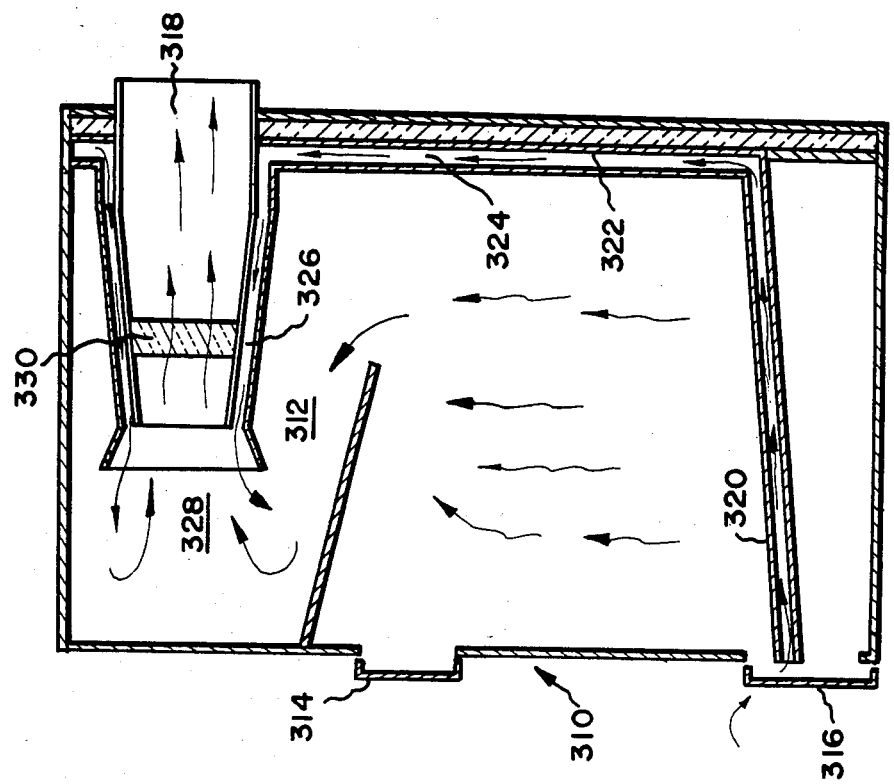
FIGS. 5 and 6 are schematic views of still further embodiments of my furnace.

In a still further embodiment, schematically shown in FIG. 6, a dual stage furnace 310 comprises a primary combustion chamber 312 which has a fuel access door 314, an ash door 316 and a flue pipe 318. A hollow air intake grate 320 made up of tubes, similar to the tubes 30 of the grate of the furnace shown in FIGS. 1–3, is tilted upwardly in the housing of the primary combustion chamber 312; rising from the front ash door 316 to the wall 322 at the rear of the housing of the primary combustion chamber 312 where it joins a hollow outside chamber 324. A hollow Venturi shaped tube 326 is joined to and extends from the outside hollow chamber 324 into primary combustion housing 312 at the inlet throat 328 of an exhaust pipe 318. Ignition of the fuel source gives off heated gases which contain, as previously explained, unburned volatiles. Outside side air drawn in through hollow grate tubes 326 is superheated and flows up hollow chamber 324 and passes into Venturi tube 326. The volatile gases meet and mix with super-heated air delivered from the Venturi tube 326 in area 328 resulting in secondary combustion. A honeycomb 330 may be placed inside the exhaust pipe 318, as shown. The secondary combustion aided by the Venturi tube causes the silicon carbide honeycomb to glow cherry red which thereby acts, possibly as a catalyst, to further ignite and consume remaining unburned volatiles. The honeycomb converter has hexagonal holes. In a preferred embodiment the honeycomb is 6 inches long, and there are twenty holes per square inch, which is quite sturdy.

In the furnaces hereinabove described it will be obvious that the hollow grates may require some manner of poking to dispose of the accumulated ashes. An appropriate movable poker or an array of poker bars may be employed. The tubes may alternatively be manually rotated through a gear system.

The furnace as illustrated and described herein is merely indicative of various forms of my invention. There are, of course, various other applications which can be derived. For example, the exhaust pipe heated secondary air intake afterburner using the Venturi 326 can be sold separately and used in retrofitting existing furnaces. It should, therefore, be understood that my invention is not limited thereto but may be embodied into other furnaces without departing from my invention as set forth in the following claims.

I claim:

1. In a solid fuel burning furnace having a primary combustion chamber, said primary combustion chamber having a wall and a hollow grate supporting a bed of fuel for superheating secondary air passing there through, the improvement comprising an afterburner which comprises an exhaust pipe which extends through the wall of said chamber entirely above said bed and defines a secondary combustion chamber entirely within said primary combustion chamber, said exhaust pipe having a throat with an open end which projects into said primary combustion chamber above said bed, a tube around said exhaust pipe defining a passage for secondary air toward the throat of said exhaust pipe, a conduit between said hollow grate and said passage for communicating superheated air toward said throat, and ignitor means in said exhaust pipe.

2. The improvement according to claim 1 wherein said igniter is a honeycomb of silicon carbide which becomes heated to cherry red temperature and ignites volatile gases passing through said exhaust pipe.

3. In a solid fuel burning furnace having a primary combustion chamber, said primary combustion chamber having a wall and a hollow grate supporting a bed of fuel for superheating secondary air passing therethrough, the improvement comprising an afterburner which comprises an exhaust pipe which extends through the wall of said chamber above said bed, said exhaust pipe having a throat with an open end which projects into said chamber, a tube around said exhaust pipe defining a passage for secondary air towards the throat of said exhaust pipe, said tube extending beyond said throat and defining a Venturi adjacent the open end of said throat, a conduit between said hollow grate and said passage for communicating superheated air toward said throat, and ignitor means in said exhaust pipe.

4. The improvement according to claim 3 wherein means are provided defining a hollow chamber adjacent said wall of said combustion chamber, said exhaust pipe extending through said hollow chamber and projecting out of said combustion chamber, the end of said tube opposite to said throat being connected to said hollow chamber so as to communicate said passage therewith, said hollow chamber being connected to said hollow grate and defining said conduit for superheated air therefrom.

5. In a solid fuel burning furnace having a primary combustion chamber, said primary combustion chamber having a wall and a hollow grate supporting a bed of fuel for superheating secondary air passing there through, the improvement comprising an afterburner which comprises and exhaust pipe which extends through the wall of said chamber above said bed, said exhaust pipe having a throat with an open end which projects into said chamber, a tube around said exhaust pipe defining a passage for secondary air toward the throat of said exhaust pipe, a conduit between said hollow grate and said passage for communicating superheated air toward said throat, said conduit communicating with said passage at a location spaced along said passage away from said throat so as to provide for the flow of said superheated secondary air in a direction opposite to the flow through said exhaust pipe out of said primary combustion chamber, and ignitor means in said exhaust pipe.

6. In a solid fuel burning furnace having a primary combustion chamber, said primary combustion chamber having a wall and a hollow grate supporting a bed of fuel for superheating secondary air passing there through, the improvement comprising an afterburner which comprises an exhaust pipe which extends through the wall of said chamber above said bed and defines therein a secondary combustion chamber entirely within said primary combustion chamber and above said bed, said exhaust pipe having a throat with an open end which projects into said chamber, a tube around said exhaust pipe defining a passage for secondary air toward the throat of said exhaust pipe, and a conduit between said hollow grate and said passage for communicating superheated air toward said throat.

7. In a solid fuel burning furnace having a primary combustion chamber, said primary combustion chamber having a wall and a hollow grate supporting a bed of fuel for superheating secondary air passing there through, the improvement comprising an afterburner which comprises an exhaust pipe which extends through the wall of said chamber above said bed, said exhaust pipe having a throat with an open end which projects into said chamber, a tube around said exhaust pipe defining a passage for secondary air toward the throat of said exhaust pipe, a conduit between said hollow grate and said passage for communicating superheated air toward said throat, said tube extending beyond said throat defining a Venturi adjacent the open end of said throat.

8. The improvement according to claim 7 wherein means are provided defining a hollow chamber adjacent said wall of said combustion chamber, said exhaust pipe extending through said hollow chamber and projecting out of said combustion chamber, the end of said tube opposite to said throat being connected to said hollow chamber so as to communicate said passage therewith, and said hollow chamber being connected to said hollow grate and defining said conduit for superheated air therefrom.

9. In a solid fuel burning furnace having a primary combustion chamber, said primary combustion chamber having a wall and a hollow grate supporting a bed of fuel for superheating secondary air passing there through, the improvement comprising an afterburner which comprises an exhaust pipe which extends through the wall of said chamber above said bed, said exhaust pipe having a throat with an open end which projects into said chamber, a tube around said exhaust pipe defining a passage for secondary air toward the throat of said exhaust pipe, a conduit between said hollow grate and said passage for communicating superheated air toward said throat, said conduit communicating with said passage at a location spaced along said passage away from said throat so as to provide for the flow of said superheated secondary air in a direction opposite to the flow through said exhaust pipe out of said primary combustion chamber.

* * * * *